United States Patent [19]

Watts

[11] Patent Number: 4,903,856
[45] Date of Patent: Feb. 27, 1990

[54] MAGNETIC PROTECTING DEVICE FOR VEHICLE TIRES

[76] Inventor: Frank Watts, 1553 E. 73rd St. North, Tulsa, Okla. 74128

[21] Appl. No.: 260,115

[22] Filed: Oct. 20, 1988

[51] Int. Cl.$^4$ ............................................. B60R 19/00
[52] U.S. Cl. .................................. 280/160; 280/160.1; 209/215
[58] Field of Search .................. 280/152.3, 158.1, 160, 280/160.1, 851, 855, 856; 209/215; 293/58, 112

[56] References Cited

U.S. PATENT DOCUMENTS

| | | |
|---|---|---|
| 759,932 | 5/1904 | Sturtevant et al. ................ 209/215 |
| 931,885 | 8/1909 | Powel et al. ........................ 280/160 |
| 1,007,878 | 11/1911 | Krell .................................... 280/160 |
| 1,178,680 | 4/1916 | Rosenthal ........................... 280/160 |
| 1,293,861 | 2/1919 | Monie ............................... 280/158.1 |
| 1,719,051 | 7/1929 | Gillrup ................................ 280/160 |
| 1,726,158 | 8/1929 | Masury et al. ...................... 280/160 |
| 1,737,952 | 12/1929 | Starch et al. ........................ 280/160 |
| 1,805,933 | 5/1931 | Victor .................................. 280/160 |
| 2,056,906 | 10/1936 | Parkhill ............................... 209/215 |
| 2,591,196 | 4/1952 | Post .................................. 280/851 X |
| 2,809,848 | 10/1957 | Carswell ............................. 280/851 |
| 3,956,111 | 5/1976 | Manfredi ............................. 209/215 |

FOREIGN PATENT DOCUMENTS

| | | | |
|---|---|---|---|
| 344920 | 11/1904 | France | 280/158.1 |
| 545534 | 10/1922 | France | 280/160 |
| 2069033 | 8/1981 | United Kingdom | 209/215 |

*Primary Examiner*—Charles A. Marmor
*Assistant Examiner*—Brian Johnson
*Attorney, Agent, or Firm*—Head & Johnson

[57] ABSTRACT

A magnet for protecting a vehicle tire from metallic debris is suspended from a web having an upper portion, an intermediate portion and a lower portion. The upper portion of this web is fixed to the vehicle with the intermediate portion of the web hanging in a vertical planar relationship facing the forward treaded surface of the tire. The magnet is at least approximately as wide as the treaded surface of the tire. The foward portion of the magnet is hinged to the lower portion of the web and rotation of the magnet about the hinge is restricted to a preselected maximum angle below horizontal.

5 Claims, 5 Drawing Sheets

MAGNETIC PROTECTING DEVICE FOR VEHICLE TIRES

FIELD OF THE INVENTION

The present invention relates to devices for protecting pneumatic tires from being punctured. The invention is particularly applicable for protecting the pneumatic tires of vehicles having a plurality of tires.

BACKGROUND OF THE INVENTION

It is will known that a large number of flats of pneumatic tires are caused by pointed metallic objects. Most of the pointed metallic objects that puncture pneumatic tires are objects that are attracted to magnets.

It has further been noted that in vehicles having a tire that is located behind but generally in the same path as another tire, the number of flats is generally greater on the back tire. The exact reason for this is not known. It has, however, been proposed that upon the passing of the vehicle an air suction is created which causes pointed metallic obstructions to be shifted from a relatively harmless prone position to an upended position that will increase the likelihood that the rear most tire will be punctured.

It has also been proposed that when the forward tire of a vehicle passes over a harmlessly positioned pointed obstruction, the obstruction is thrown back toward the following tire or is shifted into position such that it will puncture the following tire.

As the distance between two aligned tires decreases, it appears that there is a greater frequency of the puncturing of the rear tire. For example, the predominate puncturing of the rear most tire is often noted for stock trailers in which front and rear tires are separated by only a few inches, for tandem axle trucks and for motorcycles, particularly those heavier motorcycles having wider tread tires.

The phenomena of predominant rear tire puncturing is particularly disturbing for motorcycles and motor scooters since the rear tire generally bears most of the weight of the vehicle and since removal of the rear tire is much more time consuming than the front, due to the fact that the rear tire is generally connected to the wheel that is connected to the drive mechanism of the vehicle.

Many years ago some attempts were made to provide devices which would protect tires from being punctured by pointed obstructions. Some typical examples of such devices are shown in U.S. Pat. Nos. 931,885; 1,178,680; 1,719,051; and 1,726,158. A number of those devices involve the use of a magnet which is suspended near the road surface. The 931,885 and 1,178,680 patents reveal a recognition of the fact that irregularities in the road surface can subject the tire protector to deflecting impacts. The mechanisms disclosed in those patents responding to road irregularities are however quite complicated and require the employment of a number of mechanical components.

An object of the present invention is to provide a device capable of reducing the frequency of the puncturing of the tires of a vehicle which have another tire which precedes it in generally the same path.

Another object of the present invention is to provide a device which is capable of removing magnetically attracted articles from the path of a tire.

Still another object is to provide a tire protecting device which is capable of flexing when it comes into contact with irregularities in the road surface.

Other aspects, objects, and advantages of the present invention will become apparent from the following disclosure taken in conjunction with the attached drawings.

SUMMARY OF THE INVENTION

In accordance with the present invention there is provided a tire protecting device comprising attachment means for attaching said device to a vehicle in a position in front of the tire to be protected, a magnet suspending web extending downward from said attachment means, and a magnet secured to a lower portion of said web. At least a portion of the web is swingable relative to the attachment means. The magnet and the web preferably each have a width at least about equal to the width of the road contacting surface of the tire that is to be protected.

Also in accordance with the present invention, there is provided a vehicle having a front tire and a rear tire located generally in line and the inventive tire protecting device mounted between said front tire and said rear tire.

DETAILED DESCRIPTION OF THE INVENTION

A further understanding of the present invention and its objects and advantages will be provided by reference to the embodiments illustrated in FIGS. 1 through 7.

Figure 1:
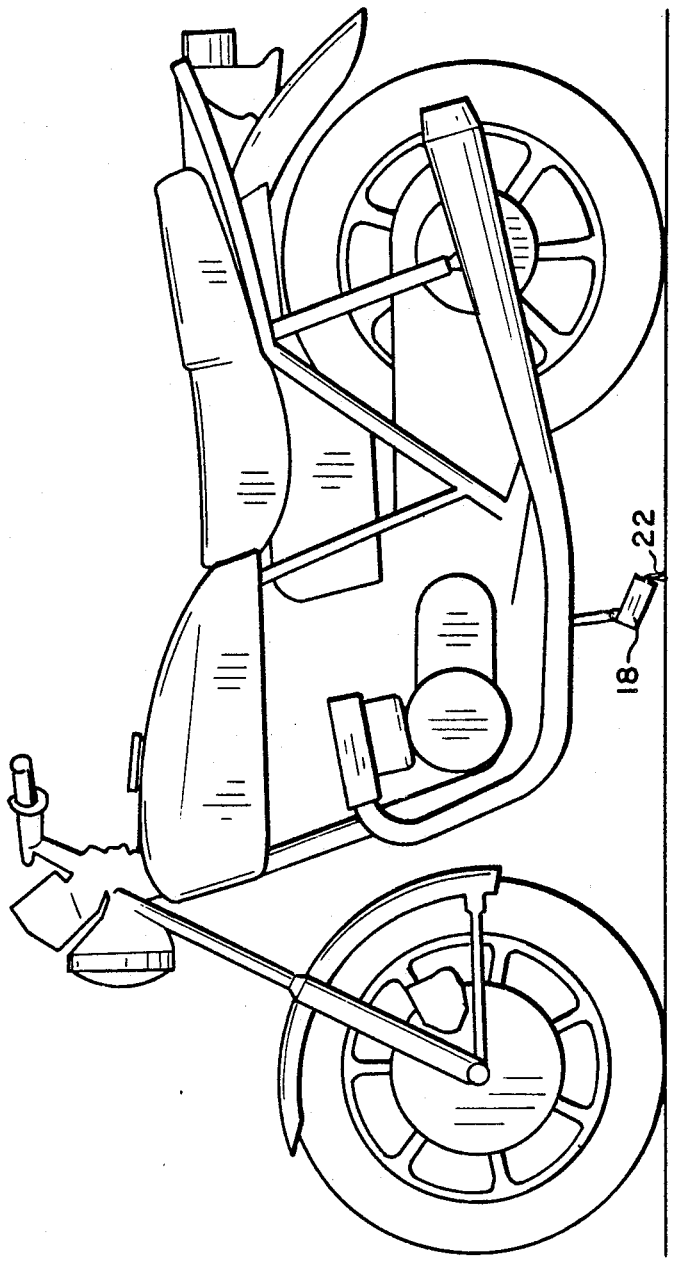
FIG. 1 is a side view of a motorcycle including one of the inventor's nail guards, also referred to as "Magna Shield".
Figure 3:
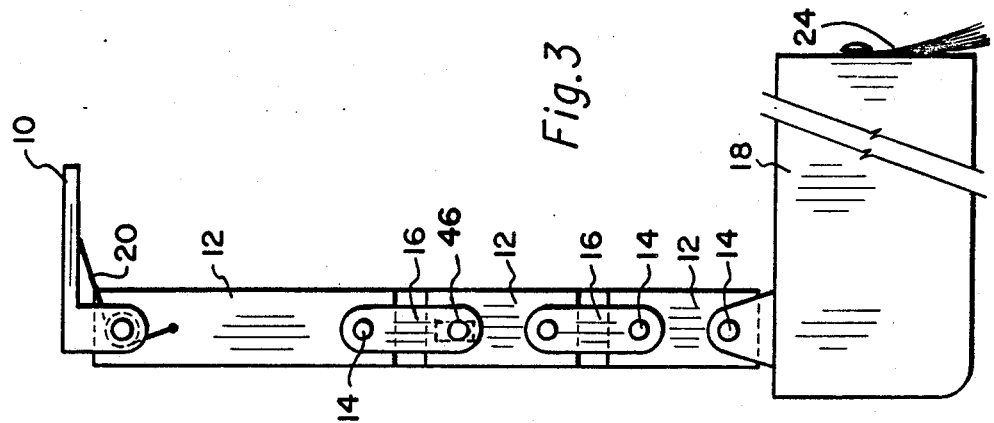
FIG. 3 is a side view of the embodiment of FIG. 1.
Figure 2:
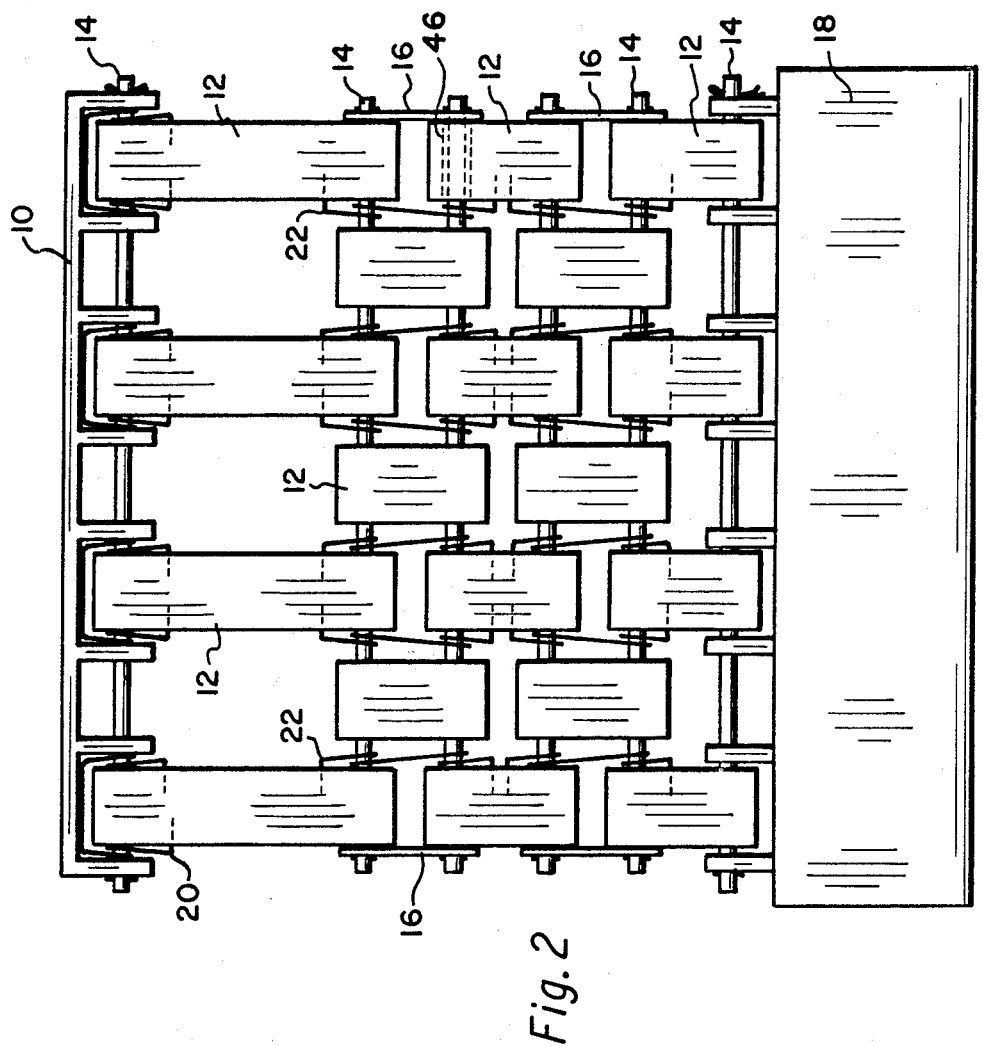
FIG. 2 is a plan front view of one embodiment of the present invention.

FIG. 1 is a diagramatical view of a motorcycle incorporating a nail guard of the type illustrated in FIGS. 2 and 3. The device comprises a downwardly depending web to which is attached a magnet bar 18. The rear of the magnet bar 18 includes downwardly depending magnetic wires 22 which can act as a sort of magnetic broom on the road surface.

Figure 5:
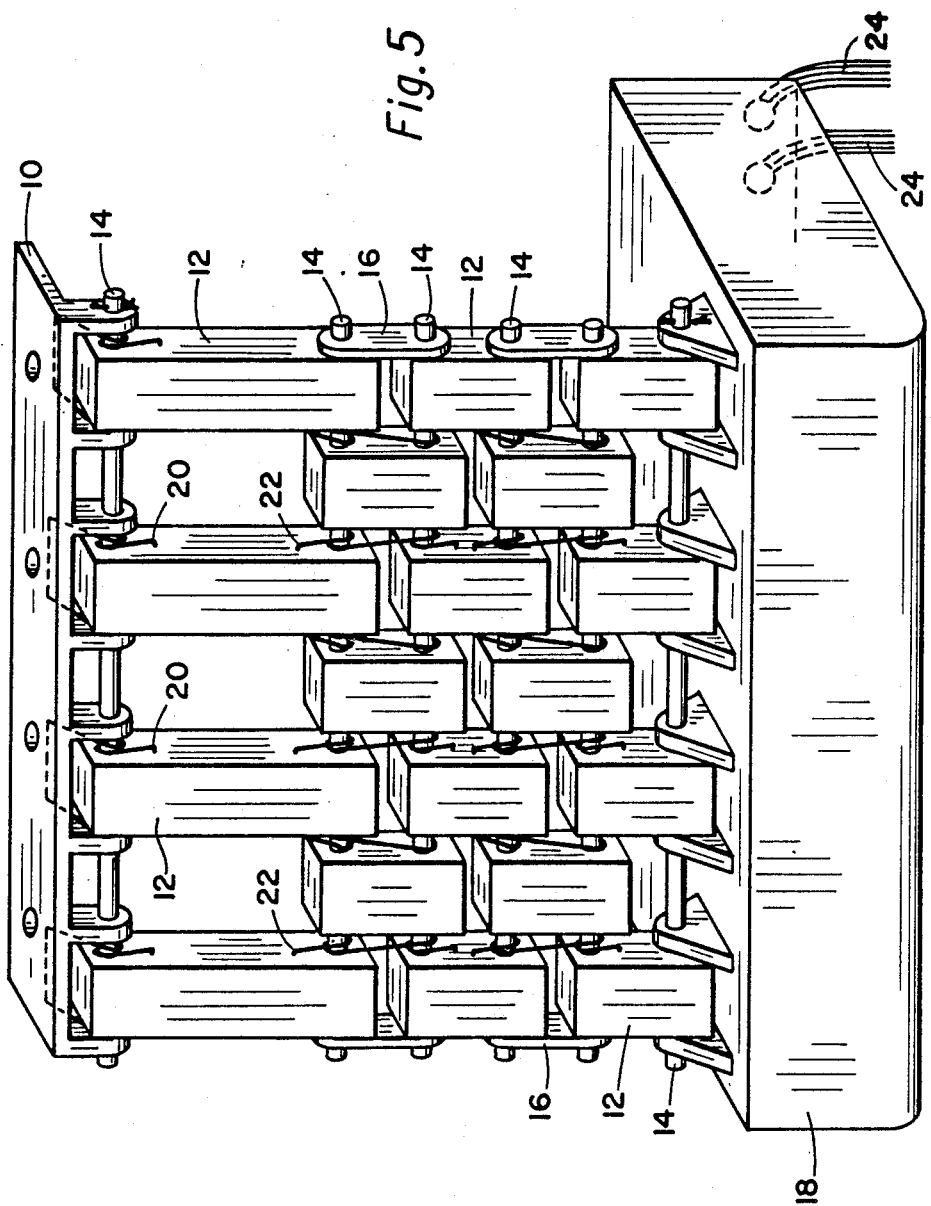
FIG. 5 is a front isometric view of the nail guard of FIGS. 2 and 3.

FIGS. 2, 3, and 5 provide an illustration of one form of the present invention. In the embodiment illustrated in those figures, the nail guard comprises a bracket 10 adapted to be mounted to a vehicle. Extending downwardly from the bracket 10 is a magnet suspending web which is comprised of a plurality of tiers of spaced apart plates 12. The plates 12 can be constructed of any suitable material. Examples of suitable materials include solid nylon, stainless steel, cast iron, or impact resistant synthetic polymeric material. The top tier of plates is secured to the bracket 10 by a pin 14 which extends through slots in the upper end of each of the plates 12 of the uppermost row and through corresponding slots in downwardly depending flanges of the bracket 10. The lower tiers of plates 12 are likewise secured by pins 14 which extend through slots in the ends of the respective plates. The outer ends of the plates 14 extend through hinge plates 16. On the opposite ends of each pin 14 there is located a cotter pin or the like, to insure that the pin 14 will remain in its desired location.

In FIGS. 2 and 3, one of the plates 12 has dotted lines 46 which illustrate how the plates contain a slot which will allow the pin to move within said plate to some extent in a direction transverse to the longitudinal axis of the plate. This arrangement allows the magnet supporting web to have some vertical flexibility which can be of importance when the device contacts large irregularities in the road surface.

The lower most tier of plates 12 is secured to the magnet bar 18 by means of a pin which extends through an opening in the lower end of each of the plates and through an opening in each of the plurality of flanges which extend upwardly from the top of the magnet bar 18. The spacing between the bottom of the plates of the lower most tier of plates 12 and the top of the magnet bar 18 is selected so as to limit the degree to which the magnet bar can swing downwardly about the pin 14. Generally it is desired for the angle between the upper face of the magnet bar 18 and the rear side of the web to be less than 180 degrees, more preferably no greater than 135 degrees.

Extending from the back side of the magnet bar 18 are a plurality of spaced apart magnetic wires 24. The wires 24 could be constructed of solid metallic material or in the currently preferred embodiment, they would each be comprised of a plurality of magnetized wire strands.

The magnetic supporting web further includes a plurality of wire spring means 20 which bias the top tier of plates 12 against rearward movement relative to the bracket 10. Further, there is included a plurality of wire spring means 22 associated with each of the plates in the lower tiers of plates which likewise bias the plates against movement.

The magnetic bar 18 could be a fixed magnet or an electromagnet connected to a suitable source of activation energy. It would likewise be within the scope of the present invention to use a combination magnet comprising an electromagnet contained within a fixed magnet. In a preferred embodiment, the magnet 18 would be encased within a synthetic polymeric coating which would help protect the magnet from undue abrasion.

It should further be noted that any number of the plates 12 of the magnet supporting web of FIGS. 2 and 3 could be also magnets.

Figure 4:
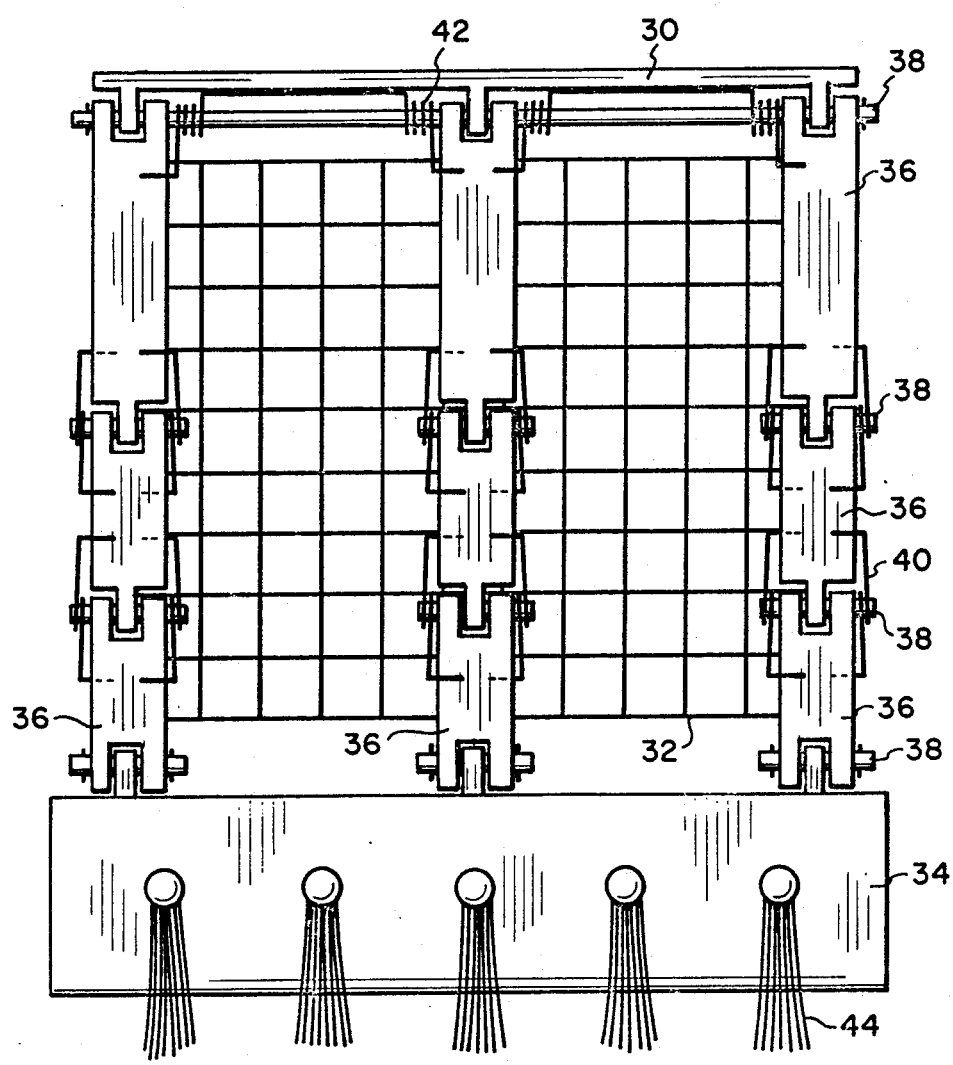
FIG. 4 is a plan rear view of another embodiment of the present invention.
Figure 6:
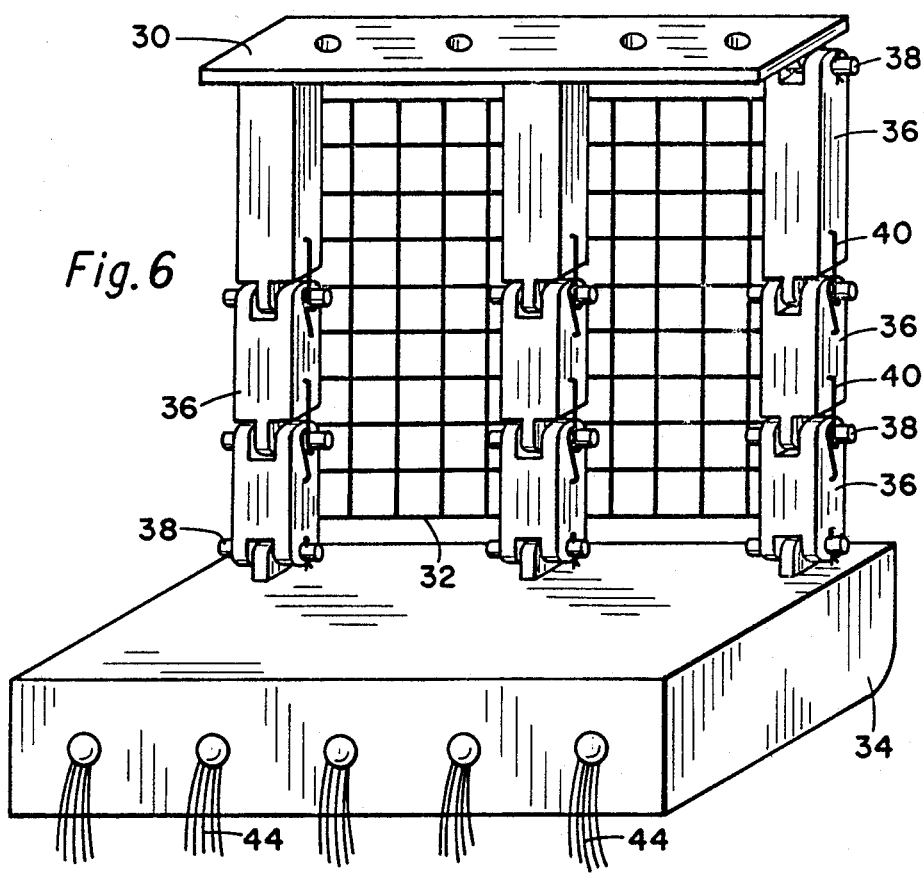
FIG. 6 is a rear isometric view of the nail guard of FIG. 4.
Figure 7:
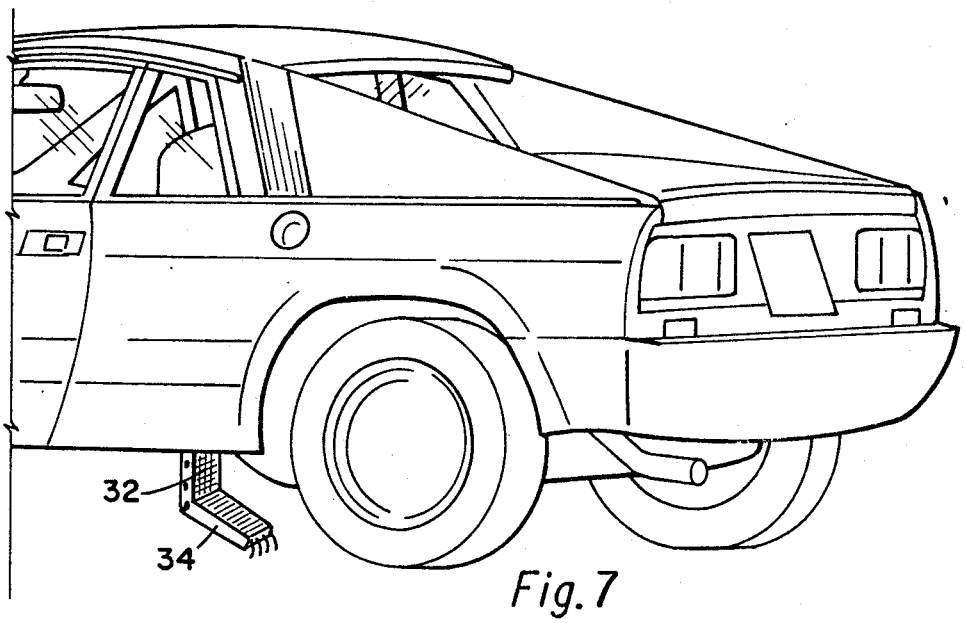
FIG. 7 is an isometric view of an automobile equipped with a nail guard of the general type shown in FIGS. 4 and 6.

Another embodiment of the present invention is illustrated in FIGS. 4 and 6. FIG. 4 shows a rear view of this alternate embodiment. In this embodiment, there is provided a bracket 30 which is used for securing the device to a vehicle. The magnet supporting web in this case comprises a web of wire mesh 32. In a currently preferred embodiment, the maximum distance between the wires of the wire mesh is about one-half inch. In this illustrated embodiment, the wire mesh 32 is secured to a plurality of flexible arms which extend downwardly from the bracket 30 to the magnet bar 34. Each of the arms comprises a plurality of plates each secured to the preceding plate by a pin 38. Each of the plates 36 has secured thereto a spring means 40 which biases the plates from rearward or forward movement. Similarly there is a spring means 42 which biases the top-most plate against rearward movement relative to the bracket 30.

In this embodiment the plates 36 could likewise be constructed of any material as described above in regard to the plates of the embodiment illustrated in FIGS. 2 and 3. In an especially preferred embodiment of the present invention, the plates 36 are constructed of magnetic material. Thus the plates 36 could comprise fixed magnets or electromagnets connected to a suitable source of power.

The pins 38 in the device shown in FIG. 4 are secured by means of cotter pins extending through the opposite ends of the pins. The lower end of the web supporting means is secured to upwardly extending flanges of the magnet bar 34 by means of pins extending through the flanges and the lower portion of the plates 36. In this embodiment, a plurality of magnetic wires 44 extend outwardly and downwardly from the rear of the magnet bar 34 in the same manner as described in regard to the embodiment illustrated in FIGS. 2 and 3.

While the present invention has now been described broadly and has been illustrated in terms of two embodiments, it should be clear that many modifications and variations can be made without departing from the spirit and scope of the invention.

What is claimed is:

1. A device for protecting the tire of a vehicle comprising:
    a web attachable to a vehicle such that said web hangs in a vertical planar relationship facing a forward treaded surface of the tire;
    a magnet having forward and rearward portions, and having a width at least approximately equal to the width of the treaded surface of the tire;
    means for hinging said forward portion of said magnet to a bottom of said web; and
    means for restricting a rotation of said magnet about said hinging means to a preselected maximum angle below horizontal;
    said web comprising a plurality of tiers of spaced apart plates, each of said plates having an upper and a lower horizontal bore therethrough transverse to the longitudinal axis of said plates, upper bores of each said tier of plates being alternately axially aligned with said lower bores of the next higher said tier of plates, a plurality of means for hingably connecting said tiers of plates, one said hingably connecting means disposed through bores aligned on the same axis, and means disposed on said hingably connecting means for securing each of said hingably connecting means in position in said bores.

2. A device according to claim 1, said securing means being a cotter pin.

3. A device according to claims 1 or 2 further comprising means for biasing said tiers of plates against hinging rotation about said hingably connecting means toward said tire.

4. A device according to claim 1 further comprising a bracket having a plurality of downwardly depending lugs spaced to receive an uppermost tier of plates of said web therebetween, each of said bracket lugs having a bore therethrough for alignment with said upper bore of its adjacent plate, means for hingably connecting said uppermost tier of plates of said web to said bracket lugs and means disposed on said hinged bracket connecting means for securing said hinged bracket connecting means in position in said bores.

5. A device according to claim 4 further comprising means for biasing said uppermost tier of plates of said web against hinging rotation about said hinged bracket connecting means toward said tire.

* * * * *